United States Patent [19]

D'Alelio

[11] 3,996,196
[45] Dec. 7, 1976

[54] POLYIMIDE-METALLO-PHTHALOCYANINES AND THEIR PREPARATION

[75] Inventor: Gaetano F. D'Alelio, South Bend, Ind.

[73] Assignee: University of Notre Dame du Lac, Notre Dame, Ind.

[22] Filed: Dec. 18, 1974

[21] Appl. No.: 533,889

Related U.S. Application Data

[62] Division of Ser. No. 514,256, Oct. 11, 1974, Pat. No. 3,890,274.

[52] U.S. Cl. .................. 260/47 CP; 260/37 N; 260/46.5 E; 260/47 UA; 260/47 P; 260/49; 260/50; 260/63 R; 260/65; 260/78 UA; 260/78 TF; 428/435; 428/458; 428/474
[51] Int. Cl.² .................................. C08G 73/10
[58] Field of Search ...... 260/47 CP, 49, 65, 78 TF, 260/326 C, 326 N, 47 U, 78 UA, 46.5 E, 50, 47 P

[56] References Cited
UNITED STATES PATENTS

| | | | |
|---|---|---|---|
| 3,513,134 | 5/1970 | Filius | 260/78 |
| 3,516,967 | 6/1970 | Funer | 260/47 |
| 3,560,551 | 2/1971 | Hillman | 260/465.4 |

*Primary Examiner*—Lester L. Lee

[57] ABSTRACT

Polyimide-metallo-phthalocyanines and processes for their preparation are provided. The products have the structural formula:

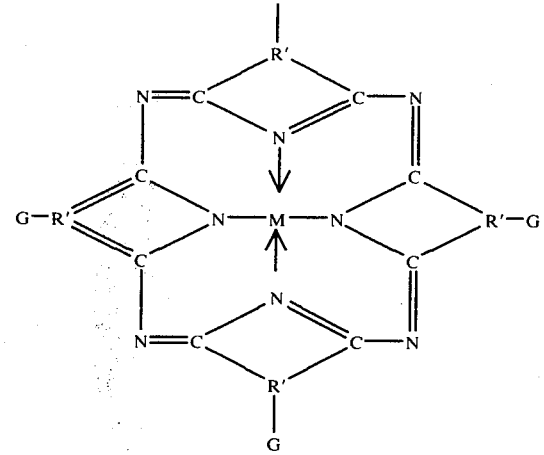

where
R' is an aromatic organic radical, the two carbon atoms attached thereto being attached to separate and adjacent carbon atoms in the aromatic radical,
M is derived from a polyvalent metal or its salt, said polyvalent metal having an atomic number of at least 12 and
G is an aromatic imide of the formula:

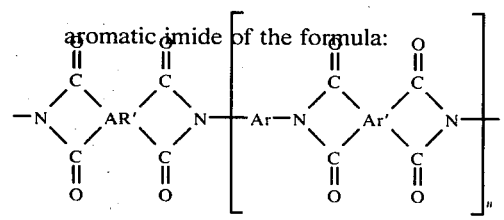

wherein
Ar is a divalent aromatic organic radical,
Ar' is a tetravalent aromatic organic radical, the four carbonyl groups being attached directly to separate carbon atoms and each pair of carbonyl groups being attached to adjacent carbon atoms in the Ar' radical, and
$n$ is a positive integer of at least one.

These products are prepared by reacting phthalonitrile-terminated polyimides with polyvalent metals, such as copper, iron, magnesium et. or salts of such metals. The materials described herein are useful as high temperature resistant coatings, molded articles and laminated structures.

17 Claims, No Drawings

POLYIMIDE-METALLO-PHTHALOCYANINES AND THEIR PREPARATION

RELATIONSHIP TO OTHER APPLICATIONS

This application is a divisional of Ser. No. 514,256, filed Oct. 11, 1974 now U.S. Pat. No. 3,890,274 issued June 17, 1975.

BACKGROUND OF THE INVENTION

1. Field of Invention

This invention relates to polyimides and processes for their preparation and more particularly to polyimide-metallo-phthalocyanines and processes for their preparation.

2. Prior Art

The invention is not aware of prior art in the polyimide field describing either the phthalonitrile-terminated polyimides or their metallo phthalocyanine derived polymers.

SUMMARY OF THE INVENTION

According to the present invention, there is provided a phthalonitrile-terminated aromatic polyimide having the structural formula:

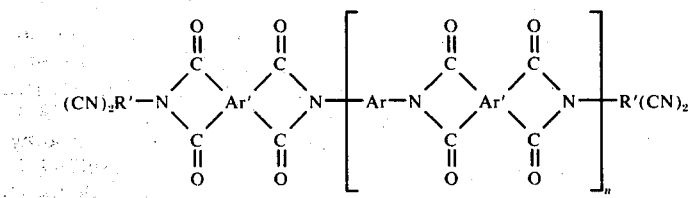

wherein

Ar is a divalent aromatic organic radical,

Ar' is a tetravalent aromatic organic radical, the four carbonyl groups being attached directly to separate carbon atoms and each pair of carbonyl groups being attached to adjacent carbon atoms in the Ar' radical, R' is an aromatic organic radical, the two cyano groups being ortho in the aromatic radical and n is a positive integer of at least 1.

There is also provided a process for preparing the above-described polyamide by reacting an anhydride end-capped, aromatic polyimide with at least two moles of a dicyanoaromatic monoamine. The phthalonitrile-terminated polyimides can be chain-extended by heat alone in the range of 180°–300° C., or by reaction with polyvalent metals having an atomic number of at least 12, or salts of such metals to prepare the corresponding polyimide-metallo phthalocyanines.

DETAILED DESCRIPTION OF THE INVENTION

The phthalonitrile-terminated, aromatic polyimides of the present invention are prepared by the azeotropic process described in my copending application Ser. No. 363,800, filed May 25, 1973, the description of which is incorporated by reference. As described in my aforesaid application, endcapped polyimides are prepared by reacting in an aromatic phenol solvent such as m-cresol using an organic azeotroping agent such as benzene $m + 1$ moles of an aromatic dianhydride of the formula:

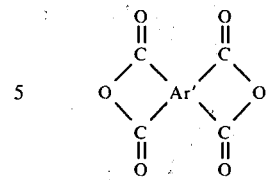

wherein Ar' is as defined previously, with $m$ moles of an aromatic diamine of the formula:

$$NH_2-Ar-NH_2$$

wherein Ar is as defined previously, and 2 moles of an aromatic monoamine. In the present invention the monoamine is a dicyano aromatic monoamine of the formula:

$$H_2N-R'-(CN)_2$$

wherein R' is an aromatic organic radical, the two cyano groups being ortho in the aromatic radical. Among the useful dianhydrides are 3,3',4,4'-benzophenonetetracarboxylic acid dianhydride, pyromellitic dianhydride, 2,3,6,7-naphthalene tetracarboxylic acid dianhydride, 3,3',4,4'-diphenyl tetracarboxylic acid dianhydride, 1,2,5,6-naphthalene tetracarboxylic acid dianhydride, 2,2',3,3'-diphenyl tetracarboxylic acid dianhydride, 2,2-bis(3,4-dicarboxyphenyl)propane dianhydride, 3,4,9,10-perylene tetracarboxylic acid dianhydride, bis(3,4-dicarboxyphenyl)ether dianhydride, naphthalene-1,2,4,5-tetracarboxylic acid dianhydride, naphthalene-1,4,5,8-tetracarboxylic acid dianhydride, decahydronaphthalene-1,4,5,8-tetracarboxylic acid dianhydride, 4,8-dimethyl-1,2,3,5,6,7-hexahydronaphthalene-1,2,5,6-tetracarboxylic acid dianhydride, 2,6-dichloronaphthalene-1,4,5,8-tetracarboxylic acid dianhydride, 2,7-dichloronaphthalene-1,4,5,8-tetracarboxylic acid dianhydride, 2,3,6,7-tetrachloronaphthalene-1,4,5,8-tetracarboxylic acid dianhydride, phenanthrene-1,8,9,10-tetracarboxylic acid dianhydride, cyclopentane-1,2,3,4-tetracarboxylic acid dianhydride, pyrrolidine-2,3,4,5-tetracarboxylic acid dianhydride, pyrazine-2,3,5,6-tetracarboxylic acid dianhydride, 2,2-bis(2,3-dicarboxyphenyl)propane dianhydride, 1,1-bis(2,3-dicarboxyphenyl)ethane dianhydride, 1,1-bis(3,4-dicarboxyphenyl)ethane dianhydride, bis(2,3-dicarboxyphenyl)methane dianhydride, bis(3,4-dicarboxyphenyl)methane dianhydride, bis(3,4-dicarboxyphenyl)sulfone dianhydride, benzene-1,2,3,4-tetracarboxylic acid dianhydride and thiophene-2,3,4,5-tetracarboxylic acid dianhydride and the like. Preferred dianhydrides are 3,3',4,4'-benzophenonetetracarboxylic dianhydride, pyromellitic anhydride and 1,4,5,8-naphthalenetetracarboxylic and dianhydride with the first one most preferred.

Preferred aromatic diamines are those wherein Ar is a divalent benzenoid radical selected from the group consisting of

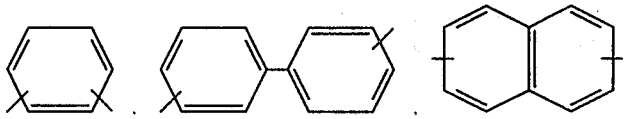

and multiples thereof connected to each other by R, e.g.,

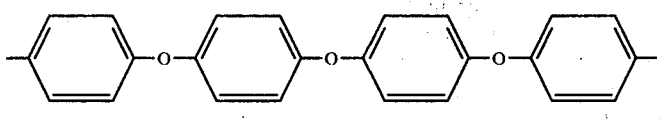

wherein R is alkylene of 1 to 3 carbon atoms,

$-O-$, $-S-$, $-CH=CH$, and $SO_2$. Other useful R groups are

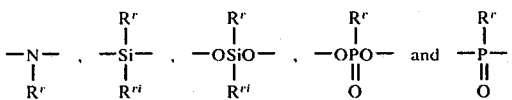

wherein $R^r$ and $R^{ri}$ are each alkyl or aryl containing 1 to 6 carbon atoms, e.g., methyl, ethyl, propyl, hexyl, n-butyl and i-butyl.

Examples of aromatic diamines which are suitable for use in the present invention are 4,4'-diaminodiphenyl propane, 4,4'-diamino-diphenyl methane, benzidine, 3,3'-dichlorobenzidine, 4,4'-diamino-diphenyl sulfide, 4,4'-diaminostilbene, 3,3'-diamino-diphenyl sulfone, 4,4'-diamino-diphenyl sulfone, 4,4'-diamino-diphenyl ether, 1,5-diamino naphthalene, 4,4'-diamino-diphenyl diethylsilane, 4,4'-diamino-diphenyl diphenylsilane, 4,4'-diamino-diphenyl ethyl phosphine oxide, 4,4'-diamino-diphenyl phenyl phosphine oxide, 4,4'-diamino-diphenyl N-methyl amine, 4,4'-diamino-diphenyl N-phenyl amine and mixtures thereof. 3,3'-dimethyl-4,4'-diaminodiphenylmethane, 3,3'-diethyl-4,4'-diaminodiphenylmethane, 3,3'-dimethoxy-4,4'-diaminodiphenylmethane, 3,3'-diethoxy-4,4'-diaminodiphenylmethane, 3,3'-dichloro-4,4',4,4'-diaminodiphenylmethane, 3,3'-dibromo-4,4'-diaminodiphenylmethane, 3,3'-dicarboxy-4,4'-diaminophenylmethane, 3,3'-dihydroxy-4,4'-diaminophenylmethane, 3,3'-disulpho-4,4'-diaminodiphenylmethane, 3,3'-dimethyl-4,4'-diaminodiphenylether, 3,3'-diethyl-4,4'-diaminodiphenylether, 3,3'-dimethoxy-4,4'-diaminodiphenylether, 3,3'-diethoxy-4,4'-diaminodiphenylether, 3,3'-dichloro-4,4'-diaminodiphenylether, 3,3'-dibromo-4,4'-diamino diphenylether, 3,3'-dicarboxy-4,4'-diaminodiphenylether, 3,3'-dihydroxy-4,4'-diaminodiphenylether, 3,3'-disulfo-4,4'-diaminodiphenylether, 3,3'-dimethyl-4,4'-diaminodiphenylsulfide, 3,3'diethyl-4,4'-diaminodiphenylsulfide, 3,3'-dimethoxy-4,4'-diaminodiphenylsulfide, 3,3'-diethoxy-4,4'-diaminodiphenylsulfide, 3,3'-dichloro-4,4'-diaminodiphenylsulfide, 3,3'-dibromo-4,4'-diaminodiphenylsulfide, 3,3'-dicarboxyl-4,4'-diaminodiphenylsulfide, 3,3'-dihydroxy-4,4'-diaminodiphenylsulfide, 3,3'-disulfo-4,4'-diaminodiphenylsulfide, 3,3'-dimethyl-4,4'-diaminodiphenylsulfone, 3,3'-diethoxy-4,4'-diaminodiphenylsulfone, 3,3'-dichloro-4,4'-diaminodiphenylsulfone, 3,3'-dicarboxy-4,4'-diaminodiphenylsulfone, 3,3'-dihydroxy-4,4'-diaminodiphenylsulfone, 3,3'-disulfo-4,4'-diaminodiphenylsulfone, 3,3'-diethyl-4,4'-diaminodiphenylpropane, 3,3'-dimethoxy-4,4'-diaminodiphenylpropane, 3,3'-dibromo-4,4'-diaminodiphenylpropane, 3,3'-dichloro-4,4'-diaminodiphenylpropane, 3,3'-dicarboxy-4,4'-diaminodiphenylpropane, 3,3'-dihydroxy-4,4'-diaminodiphenylpropane, 3,3'-disulfo-4,4'-diaminodiphenylpropane, 3,3'-dimethyl-4,4'-diaminobenzophenone, 3,3'-dimethoxy-4,4'-diaminobenzophenone, 3,3'-dichloro-4,4'-diaminobenzophenone, 3,3'-dibromo-4,4'-diaminobenzophenone, 3,3'-dicarboxy-4,4'-diaminobenzophenone, 3,3'-dihydroxy-4,4'-diaminobenzophenone, 3,3'-disulphodiaminobenzophenone, 3,3'-diaminodiphenylmethane, 3,3'-diaminodiphenylether, 3,3'-diaminodiphenylsulfide, 3,3'-diaminodiphenylsulfone, 3,3'-diaminodiphenylpropane, 3,3'-diaminobenzophenone, 2,4-diaminotoluene, 2,6-diaminotoluene, 1-isopropyl-2,4-phenylenediamine, 2,4-diaminoanisole, 2,4-diaminomonochlorobenzene, 2,4-diaminofluorobenzene, 2,4-diaminobenzoic acid, 2,4-diaminophenol, and 2,4-diaminobenzenesulfonic acid, and phenylene diamines. Preferred diamines are m-phenylenediamine, p-phenylenediamine, 4,4'-oxydianiline, 3,3'-sulfonyldianiline, 4,4'-diaminobenzophenone, 4,4'-methylenedianiline and 4,4'-diaminostilbene.

The two cyano groups in the dicyano aromatic monoamine used in the practice of this invention are attached to an aromatic group in an ortho substitution relationship as polymeric or oligomeric derivatives of phthalocyanine, and the $H_2N$ group can be attached directly to any aromatic nucleus or through a hydrocarbon group, preferably, the $CH_2$ group.

The dicyano aromatic monoamine is preferably the simplest known for this class of compounds, namely, 4-amino-phthalonitrile. However R' in the monoamine can incorporate any trivalent, aromatic hydrocarbon radical of the type illustrated in the diamine by Ar herein above but those contaning 6 to 14 carbon atoms, especially six carbon atoms, e.g.,

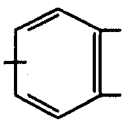

benzene, toluene, xylene, cyclohexane, cyclohexene; aromatic ethers such as methyl phenyl ether, hydroxy ethyl phenyl ether, and water. Water and methanol are preferred.

The phthalonitrile-terminated aromatic polyimide prepared by the aforesaid process (either in solution or in powder form) has the structural formula:

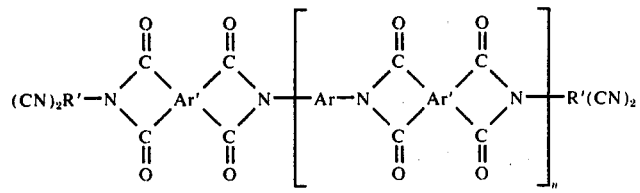

are preferred. Other preferred monoamines are $NH_2CH_2C_6H_3(CN)_2$, $NH_2C_{10}H_5(CN)_2$, and $NH_2C_{14}H_7(CN)_2$. These dicyano aromatic monoamines can also be described by the formula, $H_2N(CH_2)_y Ar''(CN)_2$ wherein;

$y$ represents zero and one, and

Ar'' is a trivalent aromatic nucleus corresponding to the divalent aromatic nucleus Ar in which the two cyano, (CN), groups are substituted ortho to each other.

In carrying out the process of the invention, a reaction mixture of $m + 1$ moles of at least one dianhydride, $m$ moles of at least one diamine and 2 moles of the dicyano aromatic monoamine, in at least one aromatic phenol solvent, is reacted in the presence of the organic azeotroping agent (usually benzene) until substantially all of the water of reaction is eliminated. The reaction temperature is less than 140° C. and also should be below the boiling point of the aromatic phenol used but higher than the boiling point of the azeotroping agent. The vapor phase temperature lies between that of the water azeotrope and no higher than 95° C. As the water of reaction and azeotroping agent are removed from the reaction mixture, quantities of the azeotroping agent are returned to the reaction mixture so as to maintain the temperature and reaction mixture volume substantially constant. It is preferred that the process be continuous with continuous removal of water and continuous return of azeotroping agent. This is conveniently done by use of a conventional Dean-Stark trap and condenser wherein after the azeotrope condenses, the water preferably sinks to the bottom of the trap for subsequent removal and the azeotroping agent overflows the trap and returns to the reaction mixture. Initially, the trap is filled with azeotroping agent.

After the water of reaction is eliminated, the azeotroping agent is usually removed so that the solution of polyimide in aromatic phenol can either be directly used as a coating composition or adhesive or further treated before the polyimide is used. Further treatment of the solution can involve precipitation of the polyimide as a powder which can then be used in end-use applications. Precipitation can occur by evaporation of the solvent or by use of a precipitating non-solvent for the polymer. Illustrative precipitating liquids, but not limited thereto, are alcohols such as methanol, ethanol, isopropanol, ethylene glycol, propylene glycol; esters such as ethyl formate, ethyl acetate, ethylene glycol diacetate; ethers such as methyl cellosolve, butyl cellosolve, ethyl cellosolve acetate; hydrocarbons such as wherein Ar is a divalent aromatic organic radical, Ar' is a tetravalent aromatic organic radical, the four carbonyl groups being attached directly to separate carbon atoms and each pair of carbonyl groups being attached to adjacent carbon atoms in the Ar' radical, R' is an aromatic organic radical, the two cyano groups being ortho in the aromatic radical and $n$ is a positive integer of at least 1, preferably at least 4, e.g., 4 to 100 and most preferably 4 to 20.

Further treatment of the polyimide solution involves chain extension, i.e. increasing the molecular weight of the polyimide, if desired, to a higher molecular weight polymer by either (a) thermally treating the polymer at a temperature of about 180° to about 300° C. alone or in solution to the increased molecular weight desired, up to and including insoluble, infusible polymers or (b) similarly by reacting the phthonitrile-terminated polyimide with a polyvalent metal or its salt, said polyvalent metal having an atomic number of at least 12, at a temperature in the range of about 180° C. to about 300° C. Illustrative of metals or their salts which can react with orthodinitrile groups are Mg, Al, Ca, Ti, V, Cr, Mn, Fe, Co, Ni, Cu, Zn, Sr, Zr, Pd, Ag, Cd, Su, Sb, Bi, Pb, Pt and Au. Suitable salts of these metals are the halides such as the fluorides, chlorides, bromides and iodides, the sulfates, nitrates, acetates, etc. Copper and iron and their salts are the preferred reactants. When 4 terminal phthalonitrile groups in the polyimides are reacted with the above-described metals or their salts, a polyimide-metallo-phthalocyanine is prepared having the following structural formula:

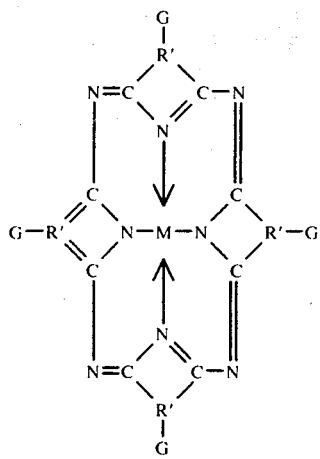

wherein
R' is as defined previously,
M is a polyvalent metal as described previously, preferably copper or iron and,
G is an aromatic imide of the formula:

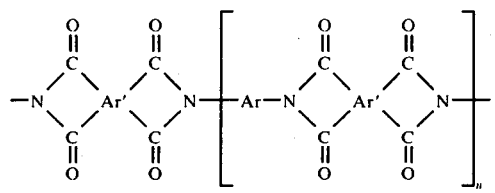

wherein Ar, Ar' and n are as defined previously.

The metal component M of the polyimide-metallophthalocyanine is preferably copper derived from copper metal or a cuprous salt such as cuprous chloride or iron derived from iron metal or ferrous chloride.

Other useful salts of iron and copper are their iodides, bromides, sulfates, nitrates, benzoates, phenates and glycinates.

The polyimide-metallo phthalocyanines are prepared by reacting the phthalonitrile-terminated polyimide with the desired metal or metal salt at a temperature within the range of 180° to 300° C.

They may be prepared by heating the phthalonitrile-terminated polyimide with the metal or metal salt at the melting point or softening point of the polyimide or by heating in the presence of a suitable solvent for the polyimide such as meta cresol, dimethyl formamide, N,N-dimethyl acetamide, sulfolane and tetramethyl urea. Particularly preferred are the well-known and widely used aprotic polymer solvents. Representative aprotic compounds are N,N-dimethylformamide, N,N-diethylformamide, N,N-dimethylmethoxyacetamide, N-methyl caprolactam, caprolactam, N,N-dimethylacetamide, N,N-diethylacetamide, dimethyl sulfoxide, N-methyl-α-pyrrolidone, tetramethylurea, hexamethylphosphoramide, tetramethylene sulfone, N,N,N',N'-tetramethyl-α-ethylmalonamide, N,N,N',N'-tetramethylglutaramide, N,N,N',N'-tetramethylsuccinamide, thiobis(N,N-dimethylacetamide), bis(N,N-dimethylcarbamylmethyl)ether, N,N,N',N'-tetramethylfuraramide, methylsuccinonitrile, N,N-dimethylcyanoacetamide, N,N-dimethyl-β-cyano-propionamide, N-formyl-piperidine and butyrolactone, etc.

Of the solvents, dimethylacetamide is most preferred. Other preferred solvents are dimethylformamide, N-methyl pyrrolidone, dimethyl sulfoxide, butyrolactone and caprolactam.

In many cases, non-aprotic solvents can be used. For example, xylene, phenol, anisole, benzonitrile, acetophenone, methylphenylether, methylene chloride, chloroform, carbon tetrachloride, or mixtures of these with each other, the aprotic solvents or with relatively poor solvents such as benzene, toluene, cyclohexane, cyclohexene, dioxane, butyl cellosolve and the like.

The time of the reaction will depend on many factors including the nature of the solvent, the concentration of the polymer in the solvent which can be as low as 5% and as high as 65–70%, the temperature of the reaction, as well as the reactivity of the metal or the metal salt. For example magnesium reacts much more rapidly than copper or iron. Similarly, the same considerations apply when the reaction is performed as a melt process. Generally, about ten minutes are required to initiate the reaction at 180° C. and only one or two minutes at 250°–300° C. The reaction can be interrupted by cooling before completion and continued later during the course of fabrication such as in the forming of molded articles, or in the form of laminated products containing reinforcing members such as glass fibers or cloth, carbon fibers and the like or as coatings on wire etc. Usually the reaction is completed in less than one hour at 250°–300° C. Post-heating of the chain-extended polyimide-metallo-phthalocyanines is advantageous, also, in eliminating retained solvents etc. from the final product.

It is surprising that the phthalonitrile-terminated polyimides of this invention, which have oligomeric or polymeric structures are capable of undergoing the phthalocyanine-forming reaction similar to the monomeric phthalonitriles as described in "The Phthalocyanines" by M. A. Dahlen, Ind. Eng. Chem. 31, 839 (1939) and are capable of generating the polyimide-metallo-phthalocyanines such as the magnesium, copper, lead, iron, silver, platinum etc. derivatives.

With phthalonitrile, four $Ar(CN)_2$ groups require one mole of metal or metal salt to form the macrocyclic phthalocyanine ring containing the metal centrally bound in the ring. An excess of metal or metal salt can be used but if used, the excess can be removed after reaction, if desired, by purification, as for example, by extraction with water in the case of cuprous chloride. Similar considerations hold in the practice of this invention. Also, in the practice of this invention less than theoretical quantities of metal or metal salts can be used and only part of the terminal phthalonitrile groups converted to the phthalocyanine derivative, the remaining unconverted polyimide serving as a plasticizer and fabrication aid for the phthalocyanine polyimide. Thus, as little as 0.01 mole of metal or metal salt, up to the theoretical or two to three times the theoretical, can be used, for each four phthalonitrile termini in the polymer, each mol weight of polymer chain containing two such phthalonitrile groups.

The phthalonitrile-terminated polyimides of this invention, as well as their derived phthalocyanine polymers have utility in the coating, laminating and molding arts. They can be used as thermally stable wire insulation, coatings on all types of substrates including refractory materials such as asbestos board, silica bricks etc. or they can be fabricated in the usual manner into reinforced laminated structures with fiber glass, carbon or boron fibers in the form of filaments, mats or cloth or they can be admixed with fillers such as choppd asbestos or glass fiber and molded in the conventional manner to heat-resistant shaped structures.

The invention can be further understood by referring to the following Examples in which parts and percentages are by weight unless otherwise indicated.

EXAMPLE 1 a. Preparation of 4-Aminophthalonitrile (APN) Reaction of 4-Nitrophthalonitrile (NPN) with Sodium Hydrosulfite ($NA_2S_2O_4$)

Into a 100-ml Erlenmeyer flask, equipped with a magnetic stirrer and a thermometer, was placed sodium hydrosulfite (17.4 g, 0.1 mole) and NaOH (4.00 g, 0.1 mole) in 75 ml of water. Then NPN (4.33 g, 0.025 mole) was added portionwise over approximately 15 minutes so that the temperature was maintained at 40°–50° C. During the addition of the NPN, the color of the solution changed from water-white to red, then to orange and finally to yellow; a copious precipitate was present when the addition was complete. Stirring was continued for an additional 15 minutes. Then the solution was filtered and the solid thus obtained was washed well with water. It was then taken up into 100 ml of warm ethanol, filtered and the ethanolic solution was evaporated on a rotary flash evaporator. The residue was vacuum-dried at 40° C. for 18 hours to afford a tan solid, APN, 1.278 g (35.6%, m.p. dec. 151°–160° C (lit. m.p. dec., 160°–170° C). The infrared spectrum displayed bands at approximately $3\mu$ for —$NH_2$ and at approximately $4.5\mu$ for —C ≡ N. In a similar manner,

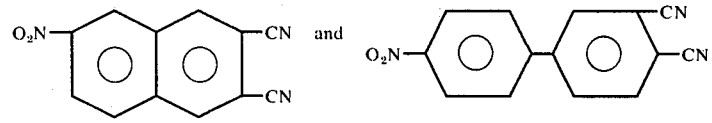

are reduced to their corresponding amino dinitrile derivative.

b. Preparation of Phthalonitrile-Terminated Oligomeric Polyimide (BTPN-1). Reaction of BTCA, SDA-3,3 and APN (5:4:2)

According to the m-cresol:azeotropic technique described in my copending application Ser. No. 363,800, filed May 25, 1973, there was allowed to react 3,3',4-,4'-benzophenonetetracarboxylic acid dianhydride (BTCA) (3.2223 g, 0.01 mole), 3,3'-sulfonyldianiline (SDA-3,3) (1.9865 g, 0.008 mole) and APN (0.5726 g, 0.004 mole) in 40 ml of m-cresol and 10 ml of benzene.

After the usual isolation procedure there was obtained 4.9825 g. (90.5%) of a yellow powder (BTPN-1). BTPN-1 was soluble in m-cresol, DMAC and sulfolane. The TGA in air displayed an inflection point in excess of 500° C. On a Fisher-Johns melting point apparatus BTPN-1 melted over the range 255°–285° C. The melt increased in viscosity as heating was continued to 300° C. Curing occured in 20 minutes.

Analysis: Calc'd for $C_{149}H_{68}N_{14}O_{33}S_4$ (BTPN-1): C, 66.03; H, 2.46; N, 7.24; O, 1949; S, 4.74. Found: C, 66.99; H, 2.66; N, 6.87; O, —; S,—.

EXAMPLE 2

Example 1(b) is repeated to prepare a phthalonitrile-terminated polyimide from BTCA, 1,3-di(3-aminophenoxy)benzene (DAPB-3,3) and APN in a molar ratio of 9:8:2. Similar melt temperatures in the range of 250°–270° C. are obtained.

EXAMPLE 3

A phthalonitrile-terminated polyimide is prepared from 3 moles of pyromellitic anhydride, 2 moles of oxydianiline and 2 moles of an amino dicyanonaphthalene of the formula

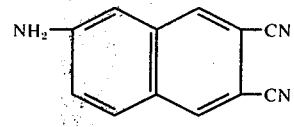

according to the procedure of Example 1(b). Similar results are obtained.

EXAMPLE 4

Example 1(b) is repeated to prepare a phthalonitrile-terminated polyimide from 7 moles BTCA, 6 moles of p-phenylene diamine and 2 moles of APN. Similar results are obtained.

EXAMPLE 5

The procedure of Example 1(b) is repeated using 2 moles of

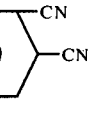

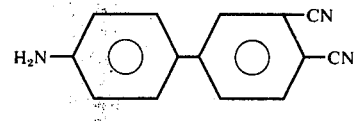

instead of APN and similar results are obtained.

EXAMPLE 6

The procedure of Example 1(b) is repeated using 2 moles of

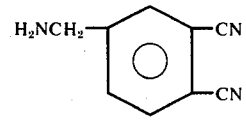

and similar results are obtained.

EXAMPLE 7

BTPN-1 prepared in Example 1(b) is used in this Example.

a. Melt Reaction of BTPN-1 with Copper Metal

An intimate mixture of BTPN-1 (0.7274 g, 0.0003 mole) and copper powder (0.0127 g, 0.0002 mole) was prepared in a wig-L-jig mixer mill. The mixture was transferred to a pyrex reaction vessel which was flushed with nitrogen and capped with a nitrogen-filled balloon. Then the filled tube was placed into a metal block preheated to 300° C. and maintained at 300° C. The sample melted completely and changed to a greenish-blue color within a few minutes. After post-curing for one hour and cooling there was obtained a dark-green solid which was insoluble in m-cresol, and which did not melt but softened slightly when dropped onto the stage of the Fisher-Johns apparatus preheated to 300° C. This chain-extended product displayed a TGA inflection point in nitrogen and in air in the 500° C. region.

b. Reaction of BTPN-1 with Cuprous Chloride in m-Cresol

Into a 50-ml round-bottom flask was placed BTPN-1 (0.5156 g., 0.0002 mole), $Cu_2Cl_2$ (0.0213 g., 0.0001 mole, corrected for 93% assay) and 10 ml. of m-cresol. The mixture was heated at reflux at ~ 200° C. for 18 hours, during which time the reaction occured and the mixture became green. After cooling, the mixture was transferred to a pyrex tube which was placed into a metal block. Heating was begun and the block temperature was raised slowly to 300° C., during which time m-cresol was distilled off. Then the chain-extended polymer was post-cured at 300° C. for 1 hour. After cooling, there was obtained a dark-green chain-extended polymer which was insoluble in m-cresol and which did not melt when a sample was placed onto the stage of the Fisher-Johns apparatus preheated to 300° C. The chain-extended polymer displayed a TGA inflection point substantially identical with the final polymer of Example 7(a).

Similar results are obtained when an equivalent of iron powder is used in 7(a). A blue powder is obtained.

c. Reaction of BTPN-1 with copper metal

The procedure of Example 7(a) is repeated using 0.9706 g. of BTPN-1 (0.0004 mole) instead of 0.0002 mole and there is obtained a product having a TGA inflection in the 550° C. region.

EXAMPLE 8

When the phthalonitrile-terminated polyimide from Example 3 is used in Example 7(a), similar results are obtained.

EXAMPLE 9

The procedure of Example 7(c) is repeated at 250° C. using an equivalent amount of magnesium powder and an insoluble, infusible phthalocyanine chain-extended polymer is obtained.

EXAMPLE 10

The procedure of Example 7(b) is repeated using an equivalent weight of stannous chloride and an insoluble, infusible phthalocyanine chain-extended polymer is obtained.

What is claimed is:
1. A polyimide-metallo-phthalocyanine having the structural formula:

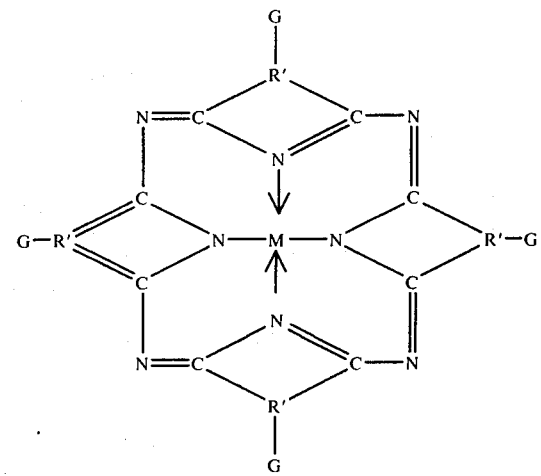

where
R' is an aromatic organic radical, the two carbon atoms attached thereto being attached to separate and adjacent carbon atoms in the aromatic radical,
M is derived from a polyvalent metal or its salt, said polyvalent metal having an atomic number of at least 12 and
G is an aromatic imide of the formula:

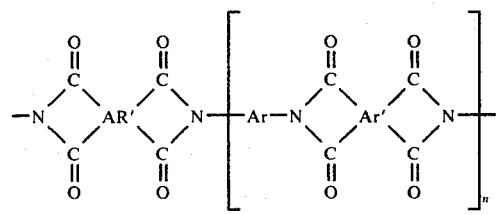

wherein
Ar is a divalent aromatic organic radical,
Ar' is a tetravalent aromatic organic radical, the four carbonyl groups being attached directly to separate carbon atoms and each pair of carbonyl groups being attached to adjacent carbon atoms in the Ar' radical, and
n is a positive integer of at least one.
2. The polyimide-metallo-phthalocyanine of claim 1 wherein Ar is selected from the group consisting of

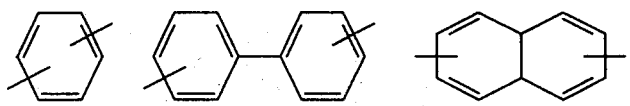

and multiples thereof connected to each other by R, wherein R is alkylene of 1 to 3 carbon atoms,

-O-, -S-, -CH=CH-, and -SO$_2$-, and Ar' is selected from the group consisting of

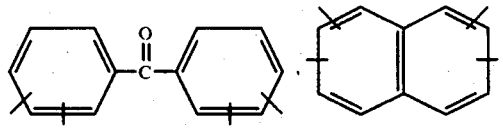

and 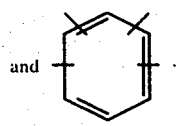

3. The polyimide-phthalocyanine of claim 2 wherein R' is a trivalent, aromatic hydrocarbon of six carbon atoms and $n$ is at least 4.

4. The polyimide-metallo-phthalocyanine of claim 2 wherein M is copper.

5. The polyimide-metallo-phthalocyanine of claim 2 containing the structural formula:

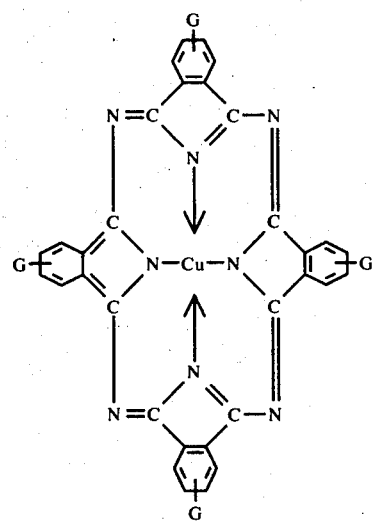

wherein G is as defined in claim 1.

6. The polyimide-metallo-phthalocyanine of claim 2 wherein the structural formula is:

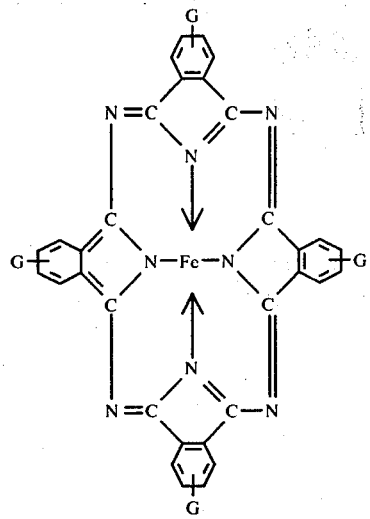

wherein G is as defined previously.

7. A process for preparing a polyimide-metallo-phthalocyanine comprising: reacting, at a temperature in the range of about 180°–300° C, a phthalonitrile-terminated polyimide having the structural formula:

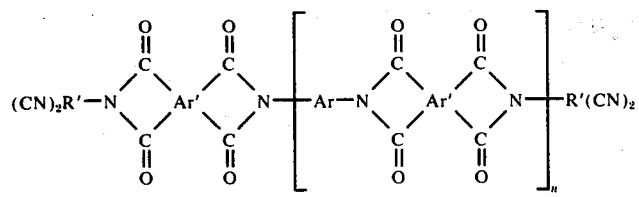

wherein
 Ar is a divalent aromatic organic radical,
 Ar' is a tetravalent aromatic organic radical, the four carbonyl groups being attached directly to separate carbon atoms and each pair of carbonyl groups being attached to adjacent carbon atoms in the Ar' radical,
 R' is an aromatic organic radical, the two cyano groups being ortho in the aromatic radical and
 $n$ is a positive integer of at least 1 with at least one of a polyvalent metal or salt of a polyvalent metal, said metal having an atomic number of at least 12.

8. The process of claim 7 wherein 1 mole of phthalonitrile-terminated polyimide is reacted with at least 0.01 mole of the metal or metal salt.

9. The process of claim 8 wherein 4 moles of the polyimide are reacted with between one and two moles of the metal or metal salt.

10. The process of claim 8 wherein the metal is copper and the salt is cuprous chloride.

11. The process of claim 8 wherein Ar is selected from the group consisting of

-continued

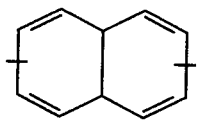

multiples thereof connected to each other by R, wherein R is alkylene of 1 to 3 carbon atoms,

-O-, -S-, -CH=CH-, and -SO$_2$-, Ar' is selected from the group consisting of

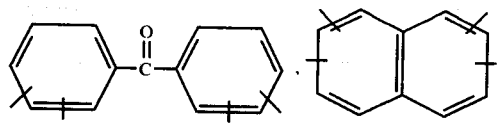

-continued

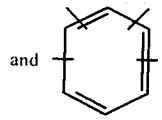

and R' is

12. The process of claim 11 wherein 4 moles of the polyimide are reacted with between one and two moles of the metal or metal salt.

13. The process of claim 12 wherein the metal is copper and the salt is cuprous chloride.

14. The process of claim 7 wherein the reaction is conducted by heating at a temperature in the range of 180° to 300° C.

15. The process of claim 14 wherein the heating of said polyimide and said metal or metal salt is in the presence of a solvent for said polyimide.

16. The process of claim 12 wherein the reaction is conducted by heating at a temperature in the range of 180° to 300° C.

17. The process of claim 16 wherein the heating of said polyimide and said metal or metal salt is in the presence of a solvent for said polyimide.

* * * * *